US 11,620,056 B2

(12) United States Patent
Wolfson et al.

(10) Patent No.: US 11,620,056 B2
(45) Date of Patent: Apr. 4, 2023

(54) SNAPSHOTS FOR ANY POINT IN TIME REPLICATION

(71) Applicant: EMC IP Holding Company LLC, Hopkinton, MA (US)

(72) Inventors: Kfir Wolfson, Beer Sheva (IL); Jehuda Shemer, Kfar Saba (IL); Itay Azaria, Dimona (IL); Lev Ayzenberg, Petakh-Tikva (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 78 days.

(21) Appl. No.: 16/457,428

(22) Filed: Jun. 28, 2019

(65) Prior Publication Data
US 2020/0409570 A1 Dec. 31, 2020

(51) Int. Cl.
*G06F 3/06* (2006.01)
*G06F 16/907* (2019.01)
*G06F 16/901* (2019.01)
*G06F 16/18* (2019.01)
*G06F 16/11* (2019.01)

(52) U.S. Cl.
CPC ............ *G06F 3/0619* (2013.01); *G06F 3/067* (2013.01); *G06F 3/0665* (2013.01); *G06F 16/128* (2019.01); *G06F 16/1805* (2019.01); *G06F 16/907* (2019.01); *G06F 16/9027* (2019.01)

(58) Field of Classification Search
CPC .. G06F 3/0619; G06F 16/1805; G06F 3/0665; G06F 16/907; G06F 16/9027; G06F 3/067; G06F 16/128
See application file for complete search history.

(56) References Cited

U.S. PATENT DOCUMENTS

| 7,844,856 | B1 | 11/2010 | Ahal et al. |
| 7,890,715 | B2 | 2/2011 | Burr et al. |
| 8,706,727 | B2 | 4/2014 | Yang et al. |
| 8,712,963 | B1 | 4/2014 | Douglis et al. |
| 8,762,362 | B1* | 6/2014 | Sathe ............... G06F 16/9027 707/706 |
| 8,819,362 | B1 | 8/2014 | Duprey et al. |
| 9,087,008 | B1 | 7/2015 | Natanzon |
| 9,229,845 | B1 | 1/2016 | Chandrasekharapuram et al. |
| 9,535,801 | B1 | 1/2017 | Natanzon et al. |
| 10,095,428 | B1 | 10/2018 | Meiri et al. |
| 10,114,581 | B1 | 10/2018 | Natanzon et al. |
| 2004/0128269 | A1* | 7/2004 | Milligan ............. G06F 16/10 |

(Continued)

FOREIGN PATENT DOCUMENTS

| CN | 104866435 A | 8/2015 |
| CN | 106354582 A | 1/2017 |
| EP | 3125119 | 2/2017 |

OTHER PUBLICATIONS

PCT/US2020/023575, Jun. 25, 2020, International Search Report and Written Opinion.

*Primary Examiner* — Ryan Bertram
(74) *Attorney, Agent, or Firm* — Workman Nydegger

(57) ABSTRACT

Systems and methods for providing any point in time functionality. With a storage system such as a VSAN, any point in time protection is achieved by combining a metadata stream with snapshots of the storage system. This allows snapshots to be generated in hindsight such that any point in time functionality is provided.

18 Claims, 5 Drawing Sheets

(56) References Cited

U.S. PATENT DOCUMENTS

| | | | |
|---|---|---|---|
| 2006/0143418 A1* | 6/2006 | Takahashi | G06F 11/1456 711/114 |
| 2006/0282471 A1* | 12/2006 | Mark | G06F 11/08 |
| 2007/0088929 A1* | 4/2007 | Hanai | G06F 3/0605 711/165 |
| 2008/0256311 A1* | 10/2008 | Lee | G06F 3/0605 711/162 |
| 2009/0177661 A1 | 7/2009 | Sandorfi et al. | |
| 2009/0217085 A1* | 8/2009 | Van Riel | G06F 11/1469 714/E11.03 |
| 2009/0254719 A1* | 10/2009 | Sasage | H04L 49/35 711/E12.001 |
| 2012/0079221 A1* | 3/2012 | Sivasubramanian | G06F 3/0673 711/E12.001 |
| 2014/0372394 A1* | 12/2014 | Frankel | G06F 16/128 707/703 |
| 2016/0070652 A1* | 3/2016 | Sundararaman | G06F 3/065 711/154 |
| 2016/0239234 A1 | 8/2016 | Berger et al. | |
| 2017/0052717 A1* | 2/2017 | Rawat | G06F 16/128 |
| 2017/0052851 A1* | 2/2017 | Sudarsanam | G06F 16/215 |
| 2017/0060449 A1* | 3/2017 | Zucca | G06F 11/1469 |
| 2018/0025021 A1 | 1/2018 | Jain et al. | |
| 2018/0067951 A1 | 3/2018 | Brandwine et al. | |
| 2018/0113625 A1* | 4/2018 | Sancheti | G06F 3/067 |
| 2018/0121129 A1 | 5/2018 | Sawhney et al. | |
| 2018/0137014 A1* | 5/2018 | Li | G06F 11/1458 |
| 2018/0210793 A1 | 7/2018 | Mamluk | |
| 2018/0295206 A1 | 10/2018 | Devaraju et al. | |
| 2019/0121705 A1 | 4/2019 | Mayo et al. | |
| 2019/0129844 A1 | 5/2019 | Zhang et al. | |
| 2019/0163765 A1* | 5/2019 | Byun | G06F 11/14 |
| 2020/0019620 A1* | 1/2020 | Sarda | G06F 16/113 |
| 2020/0042396 A1* | 2/2020 | Desai | G06F 11/1464 |
| 2020/0065408 A1* | 2/2020 | Desai | G06F 16/2246 |
| 2020/0134079 A1* | 4/2020 | Shemer | G06F 16/215 |
| 2020/0201814 A1* | 6/2020 | Danilov | G06F 16/1734 |
| 2020/0218454 A1* | 7/2020 | Hallak | G06F 3/067 |
| 2020/0226035 A1* | 7/2020 | Li | G06F 3/0652 |
| 2020/0356442 A1* | 11/2020 | Agarwal | G06F 11/1469 |
| 2022/0129155 A1* | 4/2022 | Kasso | G06F 3/064 |

* cited by examiner

SNAPSHOTS FOR ANY POINT IN TIME REPLICATION

FIELD OF THE INVENTION

Embodiments of the invention relate to systems and methods for performing computing operations including data protection operations. More specifically, embodiments of the invention relate to systems and methods for using snapshots for any point in time replication. More particularly, embodiments of the invention relate to providing any point in time replication in VSAN (Virtual Storage Area Network) systems using UPiT (Universal Point in Time) snapshots.

BACKGROUND

Backups of data are typically created so that, in the event the primary or production data fails, the production data can be restored from a backup. Today, backups provide the ability to perform restore operations such that the data can be restored at different points in time.

Unfortunately, the ability to provide any point in time functionality cannot always be achieved for all systems. This ability depends on how the data is stored. For example, a system may store data in blobs or in a manner where the data represents only the latest point in time. One consequence of storing data in this manner is that snapshots can be created only for specific points in time. In other words, snapshots in these systems cannot be created in hindsight. As a result, any point in time capability is not available.

BRIEF DESCRIPTION OF THE DRAWINGS

In order to describe the manner in which at least some of the advantages and features of the invention can be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
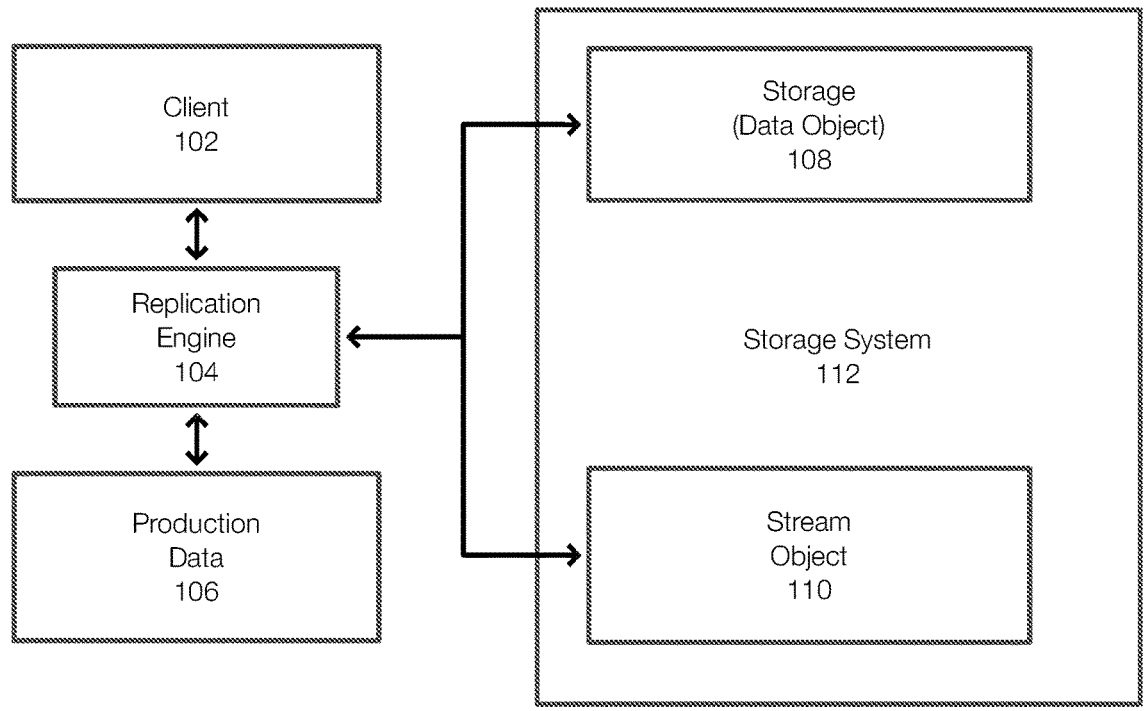
FIG. 1 illustrates an example of a system that generates a metadata stream that allows any point in time functionality for production data.

Embodiments of the present invention generally relate to data protection and to systems, methods, and apparatus for performing data protection operations. Examples of data protection operations include, but are not limited to, backup operations, restore operations, replication operations, snapshot operations, any point in time related operations including generating any point in time snapshots, or the like. More particularly, embodiments of the invention relate to systems, hardware, software, computer-readable media, and methods for any point in time recovery operations and the ability to generate snapshots in hindsight. More specifically, embodiments of the invention relate to providing any point in time functionality to systems that do not have any point in time functionality even if specific point in time functionality is available.

Embodiments of the invention relate to systems and methods that provide an efficient storage and data protection scheme for systems including VSAN systems. Embodiments of the invention disclose an efficient any point in time data structure that enables any point in time functionality for systems where the stored data only represents the latest point in time. More specifically, some of these systems only support specific point in time functionality because the data is stored in blobs that represent the latest point in time. In these systems, snapshots cannot be created in hindsight and embodiments of the invention enable these systems to generate snapshots in hindsight and enable any point in time functionality.

By way of example only, some implementations of a VSAN are systems where the stored data only represents the latest point in time. In these systems, a snapshot such as a UPiT (Universal Point in Time) snapshot to be taken. UPiT snapshots typically represent specific points in time, but do not necessarily provide any point in time functionality.

Embodiments of the invention relate to systems and methods that realize any point in time functionality for these types of systems. More specifically, embodiments of the invention enable a metadata volume or a representation of a metadata volume to be associated with or incorporated into a UPiT snapshot. The metadata volume allows a UPiT to be generated for any point in time and thus enables any point in time functionality for these types of systems. More specifically, embodiments of the invention store a metadata stream as an object in the storage system. The metadata stream contains a record of all inputs and outputs to the storage system. By incorporating the metadata stream (or a relevant portion of the metadata stream) into an existing snapshot, any point in time functionality is realized from specific point in time snapshots.

The following discussion discusses any point in time functionality using a metadata volume that is adapted in accordance with embodiments of the invention. This is followed by a discussion of relevant VSAN functionality.

Any Point in Time Functionality using a Metadata Stream

FIG. 1 illustrates an example of a computing environment in which data protection operations are performed. FIG. 1 illustrates a client 102 that is associated with production data 106 (e.g., a production volume or storage such as a VSAN). The client 102 may be a virtual machine, a computing device such as a computer, laptop, tablet, smartphone, a server computer or the like. The production data 106 may reside on a storage device (a storage array or other storage arrangement). The production data 106 may be local to the client 102 (e.g., in the same network) or remote from the client 102. The production data 106 may also be cloud based storage.

The client 102 interacts with the production data 106 and may write data or read data or perform other action. Input/ Outputs (IOs), in the context of protecting data or in data replication, may refer to actions or commands that result in changes to the production data 106. Whenever data is written (deleted, moved, modified, copied, etc.) to the production data 106, the replication engine 104 replicates the data or the change. More specifically, the replication engine 104 may replicate the action. The replication engine 104 may be incorporated into the production data 106, may be a server or other appliance, or a software layer that is configured to detect certain commands including writes and replicate the data accordingly.

In this example, the replication engine 104 thus replicates or writes the data to storage 108, which may be a datacenter, cloud storage, or the like. The replication engine may also generate a metadata stream and writes the metadata stream to a metadata stream storage as a metadata stream object 110. The stream object 110 may be in the same location (e.g., same storage system, same datacenter) or bucket as the storage 108. The stream storage 110 and the storage 108 can also be separate storages.

As discussed in more detail herein, the system shown in FIG. 1 can be adapted to different storage environments. In one example, the storage system 112 may be part of a storage system such as a VSAN. In this case, all input/outputs pass through the replication engine 104 (which may be considered to be an owner). The replication engine 104, instead of splitting the data may simply manipulate the metadata such that the metadata stream is stored as the stream object 110 and the data objects are stored as data objects 108.

Figure 2:
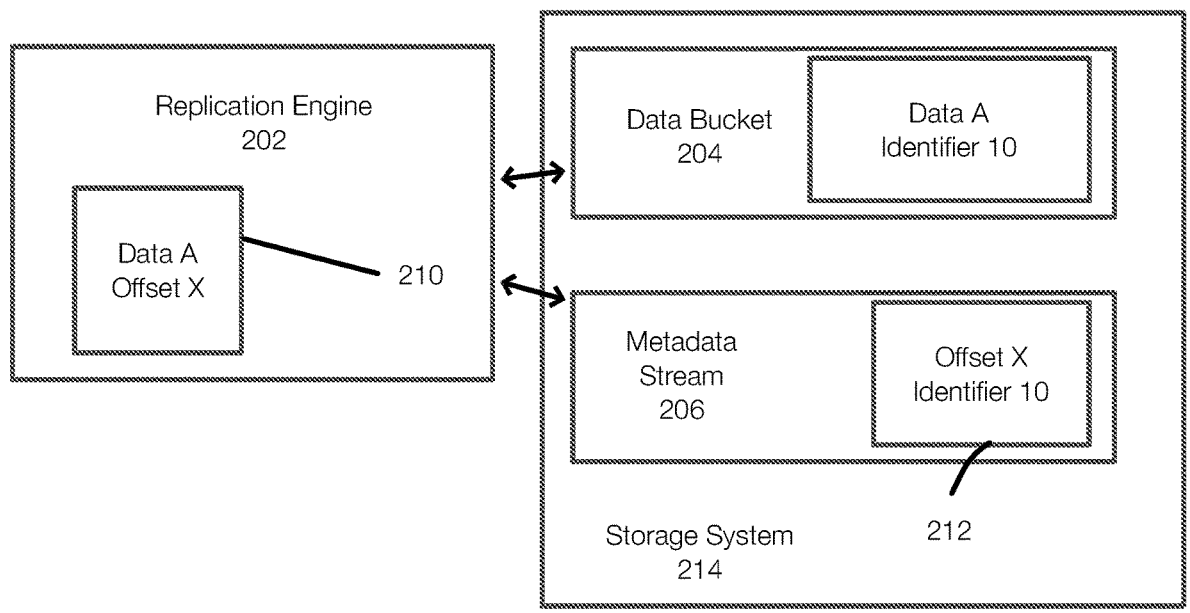
FIG. 2 illustrates the metadata stream and a relationship of the metadata stream to data for any point in time functionality.

FIG. 2 further illustrates the replication shown in FIG. 1 or, more specifically, the generation of a metadata stream. In one example, the replication engine 202 (an example of the replication engine 104) may detect an IO 210 that is being written to the production volume 208, which may store the production data 106. The replication engine 202 may determine that the IO 210 includes data A and is being written to a location identified at offset X in the data bucket 204, which is an example of a blob or of data objects stored in a storage system 214. The offset X is representative of the location of the data A in the data bucket 204. The offset X may be specified in other terms that may depend on the configuration storage system 214 and/or of the data in the data bucket 204.

The replication engine then replicates the IO 210 to the data bucket 204. In one example, the data bucket 204 is a key value type storage. Thus, the replication engine 202 can provide the data bucket 204 with data A and a key such as the identifier 10 and the IO 210 will be stored in the data bucket 204. To retrieve the data A, the data bucket is provided with the identifier 10. Using the identifier 10, the data bucket 204 can retrieve and return the data A.

While replicating the IO 210 or the data A to the data bucket 204, the replication engine 202 may add metadata associated with the IO 210 to a metadata stream 206 (an entry may be added to the metadata stream for each IO) stored in the storage system 214. In this example, the metadata stream 206 is stored as an object in the storage system 214. The metadata stream 206 typically includes metadata associated with each IO such as the IO 210. In this example, the entry 212 in the metadata stream 206 for the IO 210 includes the offset X and the identifier 10. The offset X included in the metadata stream 206 refers to the offset or other location in the data bucket 204.

In one example, the point in time recovery is typically tied to a particular IO in part because the metadata stream 206 is related to the IOs that occur at the data bucket 204. By identifying a time or an IO, embodiments of the invention allow the data bucket 204 or, more specifically, the blob or data object to be restored to that point in time or to that specific IO. This enables any point in time functionality for recovery.

In one example, the data associated with each IO is stored as an object in the data bucket 204. The data may be stored in chunks. For example, the IO 210 may be divided into 8 KB chunks. Embodiments of the invention contemplate variable sized blocks. However, fixed size objects require less processing overhead, including inherent handling of IO overlapping. The actual size of the chunk or object is typically a small number (e.g., 4 KB, 8 KB). Even though a larger object size may require fewer uploads, a larger size object may also require completing the object or block if only a portion of the object or block was written to. Also, tracking the areas that are written to in larger size blocks or objects increases the complexity.

FIG. 2 illustrates that during storage, the data A may be stored as an object A. More specifically, the data A may actually be chunked into chunks A1, A2, etc. Thus, objects A1, A2, etc., will be stored in the data bucket 204 and each chunk will have its own identifier. The metadata stream 206 stores relationships between the identifiers (which allow the corresponding objects in the data bucket 204 to be identified and retrieved) and the offset in the data bucket 204, which is an example of a production volume. During a restore, offsets and identifiers in the metadata stream allows the objects to be retrieved and written to the appropriate offset in a restored production volume.

Because the data may chunked before storing the in the data bucket, the ability to restore objects based on offsets effectively restores the data once all of the chunks have been restored.

Figure 3:
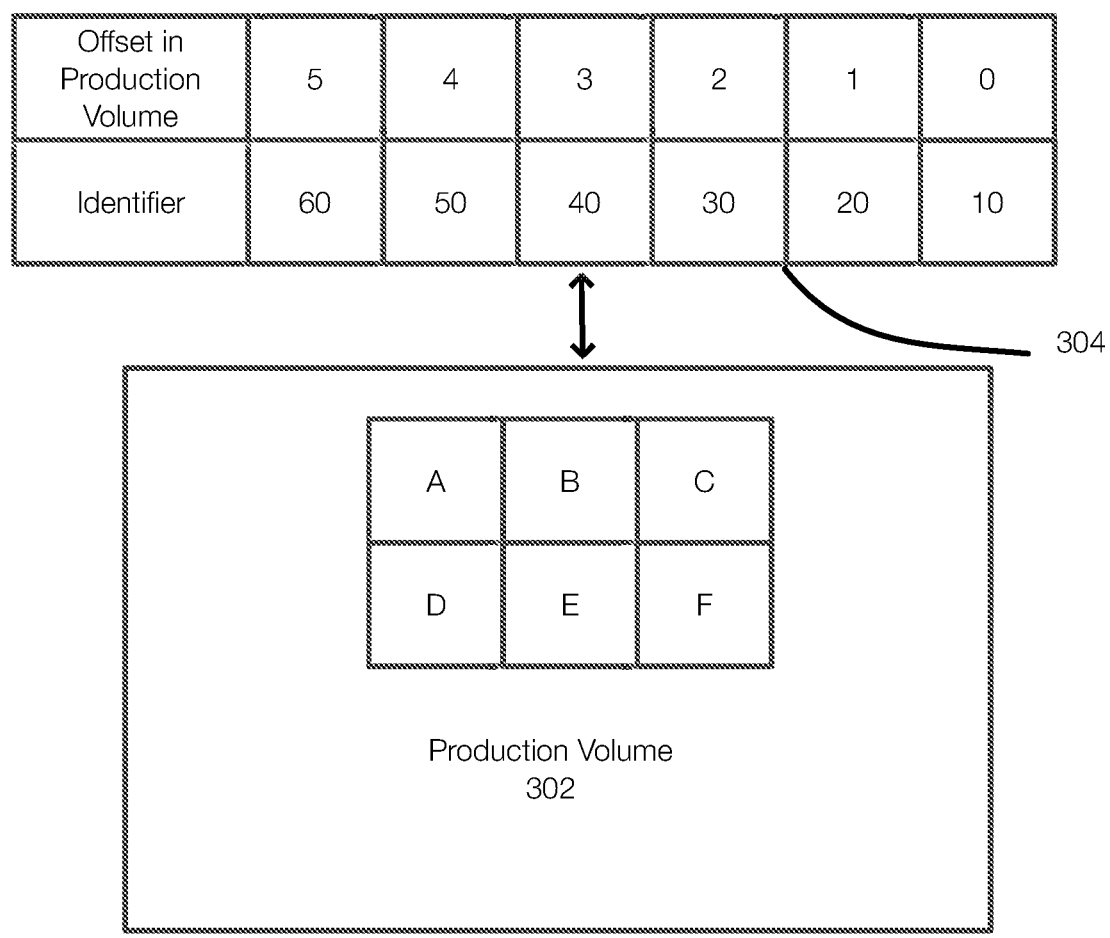
FIG. 3 illustrates an example of relationships between identifiers and offsets to data in a production volume.

FIG. 3 illustrates, more specifically, an example of a relationship between a metadata stream and a production volume. FIG. 3 illustrates a metadata stream 304 that is associated with a production volume 302. The metadata stream 304, in one example, is a sequence of IO metadata or a sequence of entries where each entry corresponds to an IO. The entries in the metadata stream 304 are related to data stored in the production volume 302. Each entry stores an offset in the production volume and an identifier. The entries in the metadata stream relate to the data after the data is chunked. Thus, the offset 0 and identifier 10 correspond to the data A (or object A) in the production volume 302. Thus, the data A is located at an offset of 0 in the production volume 302. Similarly, objects B, C, D, E, and F are located, respectively, at offsets 1, 2, 3, 4 and 5 and have identifiers 20, 30, 40, 50 and 60. The identifiers can be any data that represent the corresponding data.

Production Data Rehydration

A production volume (or production data) can be rehydrated using the objects stored in the storage (or data bucket) and the metadata stream stored in the stream object. Generally, a production volume is rehydrated or restored by creating a blank metadata volume. Once the metadata volume is created, the metadata stream is used to roll the metadata volume to the required point in time by writing identifiers to offsets in the metadata volume. This is achieved by moving forward from the tail of the metadata stream and updating the metadata volume according to each write encountered.

Each entry in the metadata volume points to an IO in the stored objects. Thus, the metadata volume includes entries that each point to an object in the object store (e.g., the data bucket) in one example. In one example, only the first encountered instance of each IO is updated in the metadata volume. More specifically, the metadata volume is updated with each encountered IO as previously discussed. This allows copying the actual IO data to the restored volume to be avoided if that specific offset is going to be overwritten before required point in time is reached. In one example, as a result, looking at the metadata stream from the required point in time to the tail, only one IO for each offset is copied.

Once the appropriate point in time has been reached in the metadata stream and all of the necessary entries in the metadata stream have been written to the metadata volume, the metadata volume is organized. The actual data has not been moved or copied at this point. Embodiments of the invention, however, contemplate copying data while organizing the metadata volume.

Once the metadata volume has been prepared, the metadata volume and the data bucket can be used to rehydrate the production volume. The rehydrated production volume is a copy of the original production volume (e.g., a virtual machine or a virtual machine's disk) at the requested point in time. In one example, actually generating the replica production volume is only required if the resulting replica volume is accessed like a regular volume.

Figure 4:
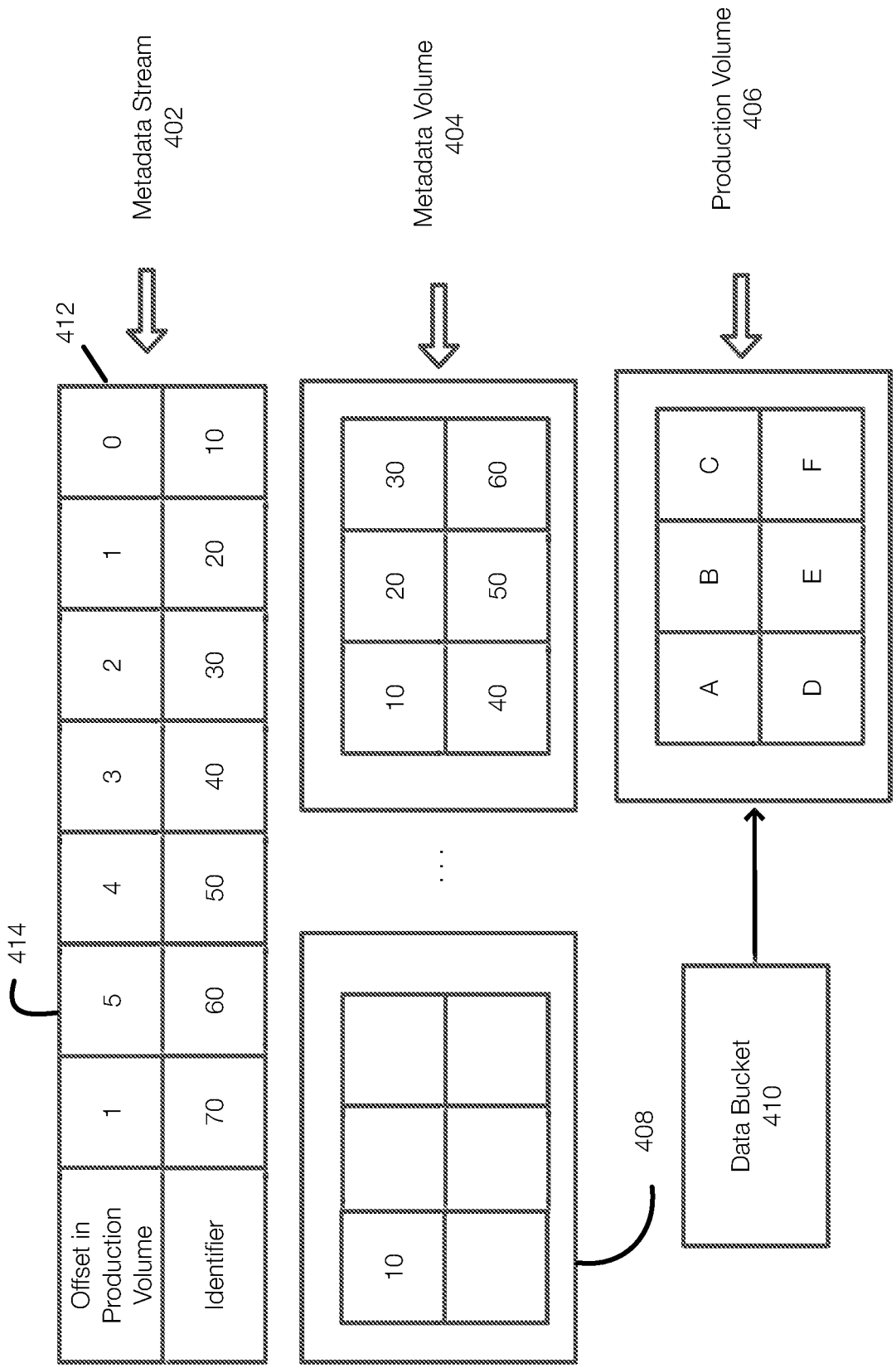
FIG. 4 illustrates an example of rehydrating data from a data bucket to a replica production volume.

FIG. 4 illustrates an example of rehydrating a production volume or rehydrating a portion of a VSAN. FIG. 4 illustrates the process of rehydrating a production volume 406 from the metadata stream 402 and the data bucket 410, which are examples of previously described metadata streams and data buckets.

In FIG. 4, the metadata volume 404 is first generated starting, in one example, from a blank metadata volume. In this example, the tail end 412 of the metadata stream 402 is read. The tail end 412 corresponds to an entry in the metadata stream 402. In one example, entry at the tail end is the oldest entry in the metadata stream 402. In this example, new entries are pushed to the head of the metadata stream. However, the metadata stream can be arranged in another manner such that the oldest entry is at the head of the metadata stream. By reading the metadata stream 402 starting with the oldest entry and then proceeding back in time, the metadata volume 404 can be populated with object or data identifiers at offsets that correspond to offsets in the production volume.

In one example, an initialized production volume may be available. This production volume may correspond to a point in time just prior to the oldest entry in the metadata stream. Using the metadata volume, which has been loaded with information from the metadata stream, the initial production volume can be rolled forward to the selected point in time. In one example, the production volume can be generated directly from the metadata stream.

In this example the identifier 10 is copied to a location that corresponds to offset 0. When the time comes to prepare the production volume 404, the identifier in the metadata volume 404 stored at the offset 0 is used to retrieve an object from the data bucket 410 and the object retrieved from the data bucket 410 is then written to the location corresponding to offset 0 in the production volume 406, which may be a replica volume.

More specifically, the metadata stream 402 is read until the point in time 414 is reached and each entry, if necessary, is written to the metadata volume. The point in time 414 is the point in time at which a restore is desired. In this example, there are six entries to be written to the metadata volume 404. Thus, the identifiers 10, 20, 30, 40, 50 and 60 are written to the corresponding locations or offsets stored in the metadata volume 404. This results in the metadata volume 404, which includes identifiers 10, 20, 30, 40, 50 and 60 written at, respectively, offsets 0, 1, 2, 3, 4, and 5.

At this stage, no data has been copied from the data bucket 410 to the production volume 406. However, it is possible to restore or rehydrate the production volume as the metadata volume 406 is being generated.

Once the metadata volume 404 for the point in time 414 is generated, the production volume 406 can be populated with data from the data bucket 410. Because the metadata volume 404 stores identifiers or keys, these identifiers can be used to access the data bucket 410 to retrieve the corresponding objects, which are written to the same or corresponding offset in the production volume 406. Thus, the identifier 10 in the metadata volume 404 is used to retrieve an object A. The object A is then written to offset 0 in the production volume, which corresponds to the identifier 10, which is written to offset 0 in the metadata volume. Once this process is completed, the production volume 406 is ready for use and can be mounted if necessary. The metadata volume 404 can be retained for a time or deleted.

VSAN Design

In one example, a VSAN is a software-defined storage product that pools storage devices to create a data store. VSAN systems have a concept called a DOM (Distributed Object Manager). The DOM may be operating on a specific ESX node and is in charge of a VSAN object. There is only one DOM per object. All IOs (input/output operations) to and from that object go through the DOM. As a result, the DOM maintains object consistency as IOs going through the DOM can be ordered in a consistent manner—whatever order the DOM decides on IOs is the "right" order of IOs.

Usually, the ESX (an example of a hypervisor) that runs a VM (virtual machine) is the DOM of that VM but that may change when vMotion is done. In this case, the VM moves to another ESX but the DOM has not moved. After a certain period of time, the VSAN will move the DOM to the running ESX as that is most efficient in terms of IO patterns.

UPiT snapshots are an example of a snapshot that may be used in a VSAN. UPiT snapshots can be the basis of many data protection operations including local snapshot protection, backup, replication, and archiving. UPiT snapshots are general snapshots and can be integrated with many storage systems or file systems that have one place that IOs pass through (e.g., a DOM).

In one example, a UPiT snapshots are implemented as B+trees (b plus trees). In a B+tree, data is stored only in the leaf nodes. Because data is stored only in (or pointed to by) the leaf nodes, internal nodes of the b+tree store only pointers. Each page or node can contain multiple pointers. Thus, the internal representation of a B+tree is compact and efficient. However, items in a btree that would be accessed once met in the tree will need to have dummy nodes in the b+tree to have their data placed only in the leaves. As a result, a b+tree may have extra nodes and all accesses operations are log(n) and not just worst case as in a conventional btree.

UPiTs can expose a user volume efficiently in a system such as a VSAN. However, UPiTs may expose specific points in time.

Embodiments of the invention combine the volume representation or a metadata stream with UPiT snapshots (or other snapshot types) to implement any point in time functionality Generally, IOs coming into the DOM are stored in a metadata stream as a separate object as discussed previously. As a result, an efficient any point in time representation on a VSAN is thus obtained and allows snapshots such as UPiT snapshots to be generated in hindsight.

When exposing a PiT to a user, for example in a VSAN, a UPiT snapshot may be used. The metadata stream allows any PiT to be created after the fact because the metadata stream stores the IO history of the VSAN or at least of the object associated with the DOM. By combining the metadata stream with the UPiT snapshot, any point in time representations of the object or volume managed by the DOM or owner can be exposed via UPiT snapshots. This allows a snapshot to be generated for any point in time and allows the same type of snapshot to be generated (e.g., a UPiT). This effectively extends any point in time functionality to UPiT snapshots and associated systems.

Figure 5:
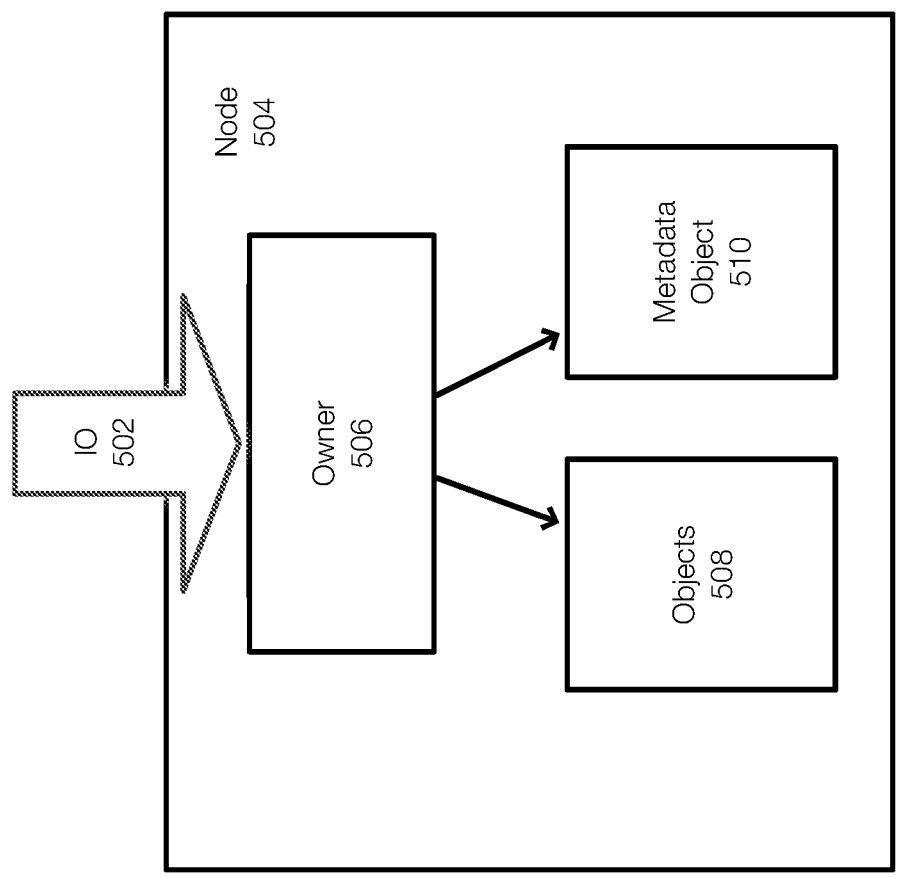
FIG. 5 illustrates an example of a node in a storage environment such as a VSAN environment and illustrates the generation of a metadata stream at the node.

FIG. 5 illustrates an example of a portion of a VSAN that is configured to provide any point in time functionality at least for that portion of the VSAN. FIG. 5 illustrates a node 504 of a VSAN. The node 504 is associated with storage and stores object or objects 508. The owner 506 on the node 504 owns the storage and thus the objects 508.

All IO 502 to the node 504 passes through the owner 506. Because all IOs 502 pass through the owner 502, a metadata stream can be maintained in an efficient manner. The metadata of the IO is stored on the VSAN as a separate object—the metadata object 510. In effect, the owner 506 is able to split an IO transaction. In this case, however, the data is not necessarily replicated as previously discussed. Rather, the metadata is manipulated or extracted from the IOs and stored in the metadata object 510.

By adding a metadata stream to the node 504, an efficient any PiT representation of a VSAN is obtained or can be generated. In addition, this has very little impact on the performance and implementation of the VSAN.

Figure 6:
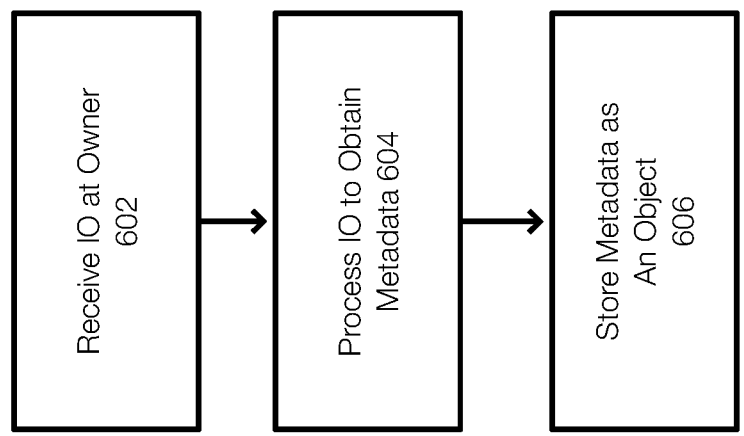
FIG. 6 illustrates an example of generating and storing a metadata stream in a storage environment.

FIG. 6 illustrates an example of a method for storing a metadata stream. An IO is received 602 by an owner such as a DOM. The IO is then processed to obtain 604 the metadata associated with the IO. The metadata is then stored 606 as an object. More specifically, the metadata is stored as a separate object in one example. This thus allows a metadata volume to be effectively stored as a metadata object in the VSAN and associated with the owner 506 and/or the portion of the VSAN associated with the node 504 and managed by the owner 506.

The metadata object 510 thus stores pointers to data in the objects 508. The metadata object 510 may be configured as described previously such that each entry includes an offset and an identifier. The any point in time object can be recovered by generating a metadata volume and then generating a production volume or a production object corresponding to the selected point in time.

More specifically, the metadata object 510, which is a representation of a metadata volume, effectively contains a history of the IOs to the node 504 or to the objects 508. As a result, the metadata object 510 can be used as previously described to create a point in time representation that cannot be achieved using a UPiT snapshot alone.

Because the structure of a b+tree is generally known, a detailed discussion is not provided here. However, a b+ (or bolus) tree typically includes some number of levels. Typically, all leaves are at the same level. Also, data is only stored in the leaf nodes of the b+tree. The other node typically contain keys and other metadata. Data is accessed by traversing the b+tree.

By storing the metadata stream in a separate object and because a UPiT is implemented as a tree such as a b+tree, the metadata object or stream can be converted to any selected PiT representation.

More specifically, the metadata stream or object stored by the owner contains pointers to data that can be used to create a PiT. As previously stated, the UPiT is a b+tree and the internal nodes of a b+tree contain only metadata pointers in a tree format. This allows a UPiT snapshot of a selected PiT to be created by manipulating only metadata from the metadata volume (the metadata object 510). In one example, no data is moved or copied while creating the UPiT snapshot.

More specifically, in order to access a point in time in this structure, a rehydration process is performed using the metadata volume represented by the metadata object 510. This is performed by scanning the relevant parts of the metadata stream to create a metadata volume. The data can then be accessed by providing access to the metadata volume that has been created from the relevant parts of the metadata stream. Alternatively, the metadata volume may be converted to a UPiT snapshot.

In one example and because storage is often limited, a moving protection window may be implemented and this may place some constraints on the any point in time functionality. Old data that has been overwritten can be deleted. In one example, one version of the data should be maintained at each disk location.

The metadata object or stream can be converted to a UPiT snapshot. As previously stated, the metadata object contains pointers to data and can be used to identify the data and any point in time. Because the UPiT is a b+tree implementation and the internal nodes of the b+tree only contain metadata pointers, the conversion or generation of a UPiT snapshot corresponding to any point in time can thus be generated by adding the metadata from the metadata object to an existing UPiT.

Thus, the rehydration method may first obtain a UPiT 702 (or a copy of a UPiT). Next, metadata manipulation is performed 704. This may include appending 706 each pointer or metadata in the metadata object (associated with a selected point in time for example) to the internal nodes of the UPiT. The metadata stored in the metadata object may include the metadata necessary to comply with the requirements of the b+tree. This allows the metadata to be appended and effectively generate a new UPIT for the selected point in time. During this process of appending metadata, the b+tree is not rebalanced 708. After all of the relevant metadata are appended to the b+tree, the tree may be rebalanced 710.

This effectively results in a UPiT for a selected PiT. Further, this can be achieved without moving or copying data while creating the new UPiT for the selected PiT. The new UPiT allows the volume or object managed by the owner or DOM to be exposed 712 if necessary to a user. This can also be used for recovery purposes or other operations. In effect, the metadata object can be combined with an existing UPiT to generate another UPiT for a selected PiT.

Figure 7:
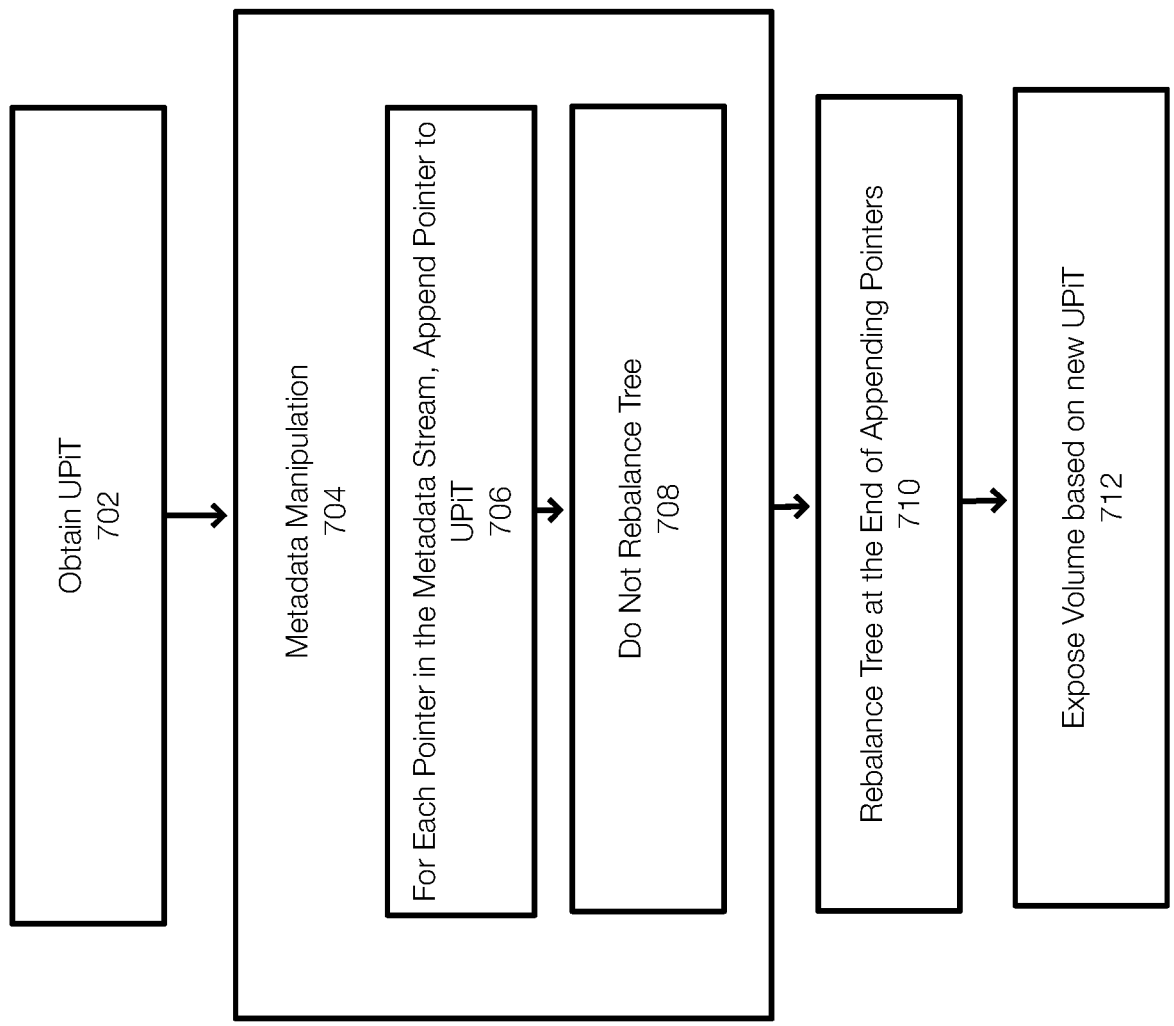
FIG. 7 illustrates an example of a method for providing any point in time functionality to a storage environment that uses snapshots.

Because the metadata object can be created for any PiT, this operation shown in FIG. 7 can be used to recreate a snapshot history. The snapshot history is generated by creating a metadata volume for a requested PiT, converting the metadata volume to a UPiT, and inserting the new UPiT into a managed snapshot tree. This allows a UPiT history to be created after the fact.

Embodiments of the invention provide an efficient manner to obtain an any point in time representation of a VSAN environment. Further, the UPiT representation is used to implement the transformations and expose in an efficient manner, moving only metadata. As a result, embodiments of the invention augment VSAN implementation with both any PiT data protection capability and an efficient way to expose volumes.

Although embodiments of the invention have been discussed with respect to UPiT and VSAN environments, embodiments of the invention are not limited. Embodiments of the invention may be applied to snapshots including snapshots that use pointers or structures to implement snapshots. Embodiments of the invention can also be applied to existing snapshot technologies such that any point in time functionality can be implemented using a metadata stream. In another example, the metadata stream may enable any point in time functionality in systems that do not use snapshots.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data management operations. Such data management operations may include, but are not limited to, data read/write/delete operations, data backup operations, data restore operations, data cloning operations, data archiving operations, and disaster recovery operations. Thus, while the discussion herein may, in some respects, be directed to a discussion of data protection environments and operations, the scope of the invention is not so limited. More generally then, the scope of the invention embraces any operating environment in which the disclosed concepts may be useful. By way of illustration, but not limitation, embodiments of the invention may be employed in connection with data backup and restore platforms such as the Dell-EMC NetWorker and Avamar and Data Domain platforms.

A data protection environment may take the form of a public or private cloud storage environment, an on-premises storage environment, and hybrid storage environments that include public and private elements, although the scope of the invention extends to any other type of data protection environment as well. Any of these example storage environments, may be partly, or completely, virtualized. The storage environment may comprise, or consist of, a datacenter which is operable to service read and write operations initiated by one or more clients.

In addition to the storage environment, the operating environment may also include one or more host devices, such as clients for example, that each host one or more applications. As such, a particular client may employ, or otherwise be associated with, one or more instances of each of one or more applications. In general, the applications employed by the clients are not limited to any particular functionality or type of functionality. Some example applications and data include email applications such as MS Exchange, filesystems, as well as databases such as Oracle databases, and SQL Server databases, for example. The applications on the clients may generate new and/or modified data that is desired to be protected.

Any of the devices or entities disclosed herein may be protected by one or more data protection policies according to various embodiments of the invention. Yet other examples of devices that may be protected by way of a data protection policy according to embodiments of the invention include, but are not limited to, containers, and VMs.

Any of the devices, including the clients, servers and hosts, in the operating environment can take the form of software, physical machines, or virtual machines (VM), or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term 'data' is intended to be broad in scope. Thus, that term embraces, by way of example and not limitation, data segments such as may be produced by data stream segmentation processes, data chunks, data blocks, atomic data, emails, objects of any type, files, contacts, directories, sub-directories, volumes, containers, and any group of one or more of the foregoing.

Example embodiments of the invention are applicable to any system capable of storing and handling various types of objects, in analog, digital, or other form. Although terms such as document, file, block, or object may be used by way of example, the principles of the disclosure are not limited to any particular form of representing and storing data or other information. Rather, such principles are equally applicable to any object capable of representing information.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or other machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for realizing any point in time functionality in a storage system, the method comprising:
    receiving an input/output at an owner of an object in the storage system, the storage system storing objects;
    extracting metadata associated with the input/output;
    manipulating and storing the extracted metadata in a metadata object that is owned by the owner, wherein the manipulated metadata includes the metadata object and a data object;
    performing the input/output on the object;
    generating a new snapshot for a selected point in time by only manipulating the metadata object and without copying or moving data included in the objects;
    restoring a production volume by:
        scanning the metadata object to determine relevant metadata included in the metadata object;
        creating a metadata volume from a blank metadata volume by writing relevant metadata from the metadata object corresponding to the new snapshot to populate the blank metadata volume, the metadata including identifiers, wherein each identifier points to data in the objects; and
        while creating the metadata volume, hydrating the production volume using the metadata volume and the objects, wherein the production volume corresponds to the selected point in time.

2. The method of claim 1, further comprising converting the metadata object with a snapshot of the object and appending the relevant portion of the metadata object into the snapshot of the object.

3. The method of claim 2, wherein the snapshot of the object comprises a b+tree and wherein the new snapshot comprises a b+tree.

4. The method of claim 3, wherein the storage system comprises a VSAN.

5. The method of claim 4, further comprising appending the relevant portion of the metadata object to internal nodes of the b+tree.

6. The method of claim 1, wherein all IOs for the object pass through the owner.

7. The method of claim 1, further comprising exposing the object based on the new snapshot.

8. The method of claim 1, further comprising rebalancing the new snapshot after all of the relevant portion of the metadata objects has been appended to the snapshot of the object.

9. The method of claim 1, further comprising generating the new snapshot in hindsight.

10. A non-transitory computer readable medium comprising computer executable instructions configured to be executed by a processor to perform a method for realizing any point in time functionality in a storage system, the method comprising:
    receiving an input/output at an owner of an object in the storage system, the storage system storing objects;
    extracting metadata associated with the input/output;
    manipulating and storing the extracted metadata in a metadata object that is owned by the owner, wherein the manipulated metadata includes the metadata object and a data object;
    performing the input/output on the object;
    generating a new snapshot for a selected point in time by only manipulating the metadata object and without copying or moving data included in the objects;
    restoring a production volume by:
        scanning the metadata object to determine relevant metadata included in the metadata object;
        creating a metadata volume from a blank metadata volume by writing relevant metadata from the metadata object corresponding to the new snapshot to populate the blank metadata volume, the metadata including identifiers, wherein each identifier points to data in the objects; and
        while creating the metadata volume, hydrating the production volume using the metadata volume and the objects, wherein the production volume corresponds to the selected point in time.

11. The non-transitory computer readable medium of claim 10, further comprising converting the metadata object with a snapshot of the object and appending the relevant portion of the metadata object into the snapshot of the object.

12. The non-transitory computer readable medium of claim 11, wherein the snapshot of the object comprises a b+tree and wherein the new snapshot comprises a b+tree.

13. The non-transitory computer readable medium of claim 12, wherein the storage system comprises a VSAN.

14. The non-transitory computer readable medium of claim 13, further comprising appending the relevant portion of the metadata object to internal nodes of the b+tree.

15. The non-transitory computer readable medium of claim 10, wherein all IOs for the object pass through the owner.

16. The non-transitory computer readable medium of claim 10, further comprising exposing the object based on the new snapshot.

17. The non-transitory computer readable medium of claim 10, further comprising rebalancing the new snapshot after all of the relevant portion of the metadata objects has been appended to the snapshot of the object.

18. The non-transitory computer readable medium of claim 10, further comprising generating the new snapshot in hindsight.

\* \* \* \* \*